Sept. 13, 1932.        J. G. RUCKELSHAUS ET AL        1,877,536
REFRIGERATION
Filed May 6, 1931
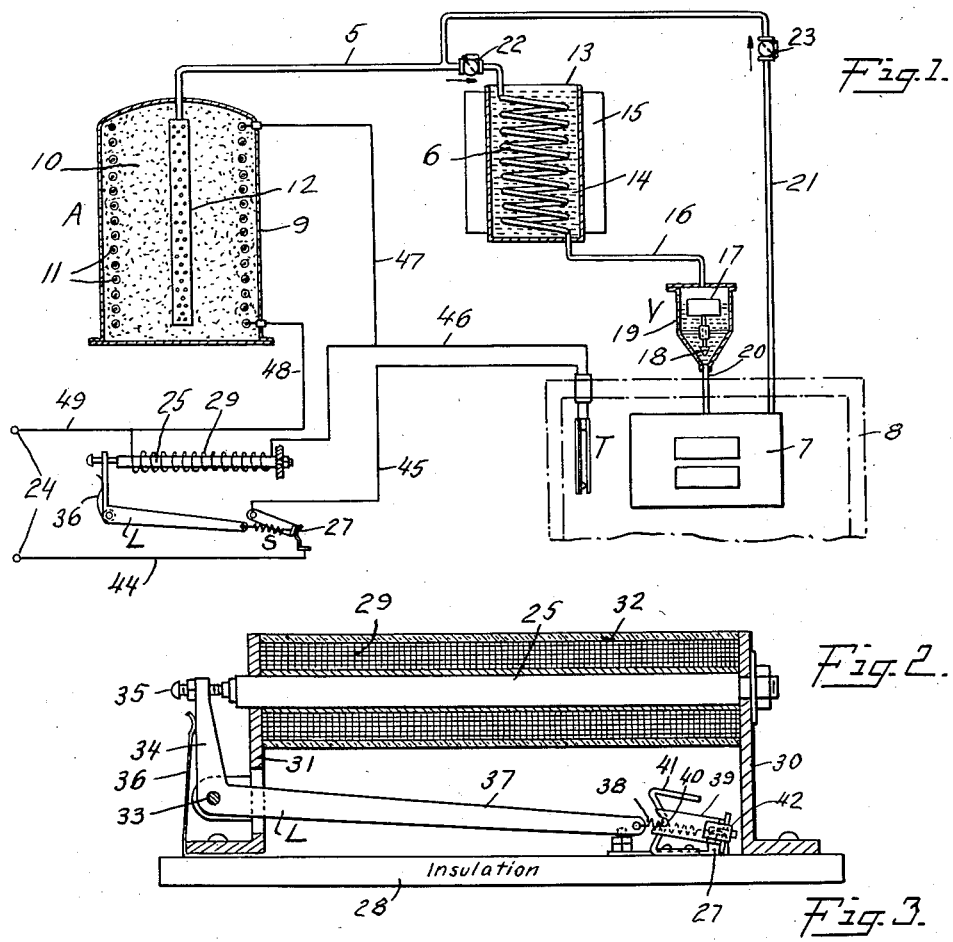
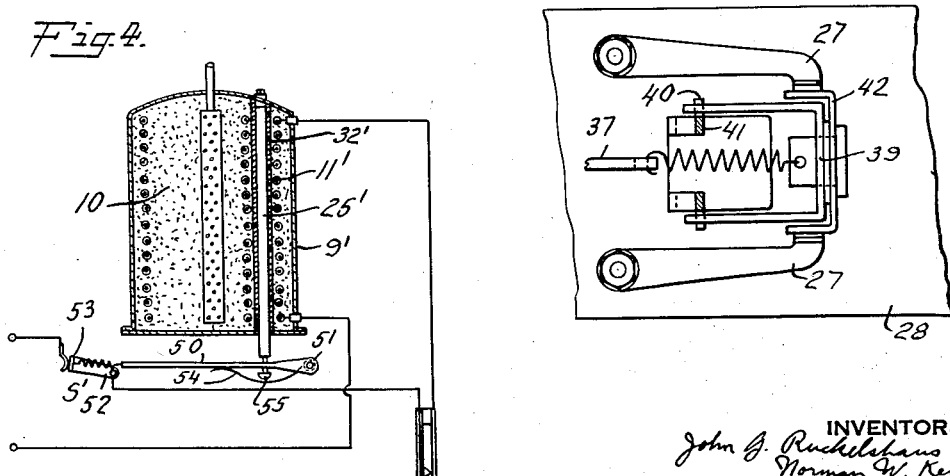
INVENTORS
John G. Ruckelshaus &
Norman W. Kempf
BY
Pennie, Davis, Marvin & Edmonds.
ATTORNEYS Patented Sept. 13, 1932

1,877,536

UNITED STATES PATENT OFFICE

JOHN G. RUCKELSHAUS AND NORMAN W. KEMPF, OF NEWARK, NEW JERSEY

REFRIGERATION

Application filed May 6, 1931. Serial No. 535,444.

This invention relates to refrigeration and more particularly concerns an improved automatic refrigeration system of the absorption type.

In absorption refrigeration systems, a suitable refrigerant, such as ammonia, is first distilled from an absorbent by the application of heat, is then cooled and condensed to liquid form in a condenser and delivered as a liquid to the refrigeration element or evaporator which is located in the refrigerator or other space to be cooled. The described steps comprise the distillation cycle of the system. When the distillation cycle has proceeded until the required quantity of refrigerant has been distilled from the absorbent material, the supply of heat is cut off and the absorbent is cooled and absorbs the gaseous refrigerant from the evaporator, thereby lowering the evaporator pressure and causing gasification of the liquid refrigerant therein whereby the desired refrigerating or heat absorbing effect is produced. The second stage of the process is usually termed the absorption cycle.

It is the object of the present invention to provide an improved simplified control means for absorption refrigeration system of the type described. More specifically, it is proposed to provide control means which act automatically to successively initiate the distillation and absorption cycles of the system at predetermined intervals. A further object of the invention resides in the provision of improved periodically operable control means of the type indicated which is operated in accordance with or governed by the energy employed to heat absorbent material during the distillation cycle, or more specifically, by the heat supplied to the absorbent material during the distillation cycle.

It is another object of the invention, to provide a control for an absorption type refrigeration system incorporating timing means for periodically successively initiating the distillation and absorption cycles together with temperature responsive means for preventing the initiation of a distillation cycle regardless of the operation of the timing means provided the temperature of the refrigerated space is below a predetermined value. The temperature responsive means is preferably so arranged as to be incapable of interrupting a distillation cycle once such cycle has been initiated by the timing means.

In general, the objects of our invention are carried out by providing a timing device which periodically operates to supply heat energy to the absorbent material of an absorption refrigeration system and periodically operates to cut off the supply of such energy and allow the absorbent material to cool, thus alternately and successively initiating the distillation and absorption cycles of operation at predetermined intervals. The timing device is preferably operated by the same energy as that employed to heat the absorbent material, and in a preferred form of the invention, this device comprises a thermally expansible element which acts to cut off the supply of heating energy when heated to a predetermined temperature by such energy and which further acts upon cooling to a predetermined temperatures to again supply heating energy to the absorbent material. The expansible element may be supplied with heat from a separate heating unit or may be operated by the heating element which supplies heat to the absorbent material. In one form of the invention, the supply of heating energy to the absorbent material is further controlled by a device responsive to the temperature of the evaporator or the refrigerated space. This device is arranged to prevent the supply of heating energy to the absorbent material by the timing device until the temperature of the refrigerated space or evaporator has risen above a predetermined value thereby delaying the initiation of a distillation cycle until further refrigeration is needed. Since the evaporator temperature rises slightly during each distillation cycle, the temperature operable device cannot operate to cut off the supply of energy during a distillation cycle, and accordingly, after a distillation cycle is once initiated by the timing device, such cycle proceeds for its normal period.

The invention will be best understood by reference to the accompanying drawing in which certain embodiments thereof have been illustrated. In the drawing;

Figure 1 is a diagrammatic and simplified representation of an absorption type refrigeration system embodying the control means of the present invention;

Fig. 2 is an elevation, partly in section, of the timing device employed in the system of Fig. 1;

Fig. 3 is an enlarged plan view of the contact mechanism of the device shown in Fig. 2, certain parts being broken away to show the construction; and Fig. 4 is a partial diagrammatic representation of a modified form of control means embodying the present invention.

Referring to the drawing and more particularly to Fig. 1, the system shown comprises generally an absorber-generator A connected through a pipe 5, a condenser coil 6 and an expansion valve V to an evaporator or refrigeration element 7 which is located in a refrigerator cabinet 8 or other space to be refrigerated. The absorber-generator A comprises a casing 9 filled with a suitable absorbent material 10 such as calcium chloride or the improved absorbent described and claimed in our copending application, Serial No. 521,003, filed March 7, 1931. Heating means such as the electric heating coil 11 are disposed within the casing 9 or otherwise in heat exchanging relation to the absorbent material 10. The absorbent material 10 may be cooled by heat transfer to convection air currents flowing along the outer surfaces of the casing 9, or a water coil or other air or water cooling means may be provided for this purpose. A perforated manifold 12 is preferably disposed within the casing 9 and is connected to the pipe 5 as shown.

The condenser coil 6 may be cooled by air, water or any other suitable medium. As shown, this coil is disposed within a tank 13 containing a cooling liquid 14 from which heat may be dissipated to the surrounding atmosphere by the fins or projections 15. The lower end of the condenser is connected by the pipe 16 to the expansion valve V. This valve may be constructed in any suitable known manner and is preferably arranged to maintain sufficient refrigerant pressure in the condenser coil 6 during each distillation cycle so that condensation and liquefication of the refrigerant takes place at the available condenser temperature. As shown, the valve V may be operated by a float 17 which raises and moves the valve gate 18 away from its seat only after a predetermined amount of liquid refrigerant has collected in the float chamber 19. The outlet of the valve V is connected to the evaporator 7 by a pipe 20.

The evaporator may be of any known construction and comprises generally a closed container in which the liquefied refrigerant is permitted to gasify and so absorb heat. The evaporator is connected by an outlet pipe 21 to the pipe 5 leading to the absorber-generator container 9. A check valve 22 in the pipe 5 permits the flow of refrigerant from the absorber-generator A to the condenser coil 6 during each distillation cycle and prevents the return flow of refrigerant through the condenser coil during each absorption cycle. A second check valve 23 in the pipe 21 permits the flow of refrigerant from the evaporator 7 to the absorber-generator A during each absorption cycle and prevents the return of refrigerant to the evaporator through the pipe 21 during each distillation cycle.

Referring now more particularly to the control means of the system shown in Fig. 1, electric energy from a suitable source represented by the terminals 24 is at times supplied to the heating coil 11 of the absorber-generator A through a timing switch S and a temperature responsive switch T. The temperature switch or thermostat T, the sensitive element of which is disposed within the refrigerator cabinet 8, is designed in any known manner to close its contacts when the refrigerator temperature rises to a predetermined value near the maximum desired cabinet temperature, and to open such contacts when the refrigerator temperature drops below such value.

The timing device or switch S may take any one of a number of suitable forms. This switch is preferably designed to successively maintain the heater coil energizing circuit closed for a predetermined interval and open for a predetermined and preferably longer interval. In the preferred embodiment of the invention, the timing element is operated by the same energy which heats the absorber-generator A. As diagrammatically illustrated in Fig. 1, the device S may comprise a rod or bar 25 made of metal having a high positive coefficient of temperature expansion, an electric heating coil 29 surrounding the bar and mechanism for operating the switch contacts 27 in accordance with the expansion or contraction of the bar.

A timing switch embodying the described features is shown in detail in Figs. 2 and 3. This switch comprises an insulating base 28 having an electric heating coil 29 mounted thereon between the brackets 30 and 31. The expansible rod or bar 25 passes through the coil 29 and is fixed at one end to the bracket 30, the opposite end of the bar being free to slide through an opening in the bracket 31. A heat insulating sleeve 32 is preferably disposed about the coil 29 to delay the cooling of this coil and the rod 25 for a considerable period after the coil has been deenergized. A bell crank lever L is pivoted on a shaft 33 carried on spaced extensions of the bracket 31. The short arm 34 of the lever L is provided with an adjustable set screw 35 which engages the free end of the expansible bar 25 and a spring 36 fixed to the base 28 holds the set screw in engagement with the bar 25. The long arm 37 of the lever L extends through an opening in the bracket 31 and is connected at its end to one end of a coiled tensioned spring 38, the other end of which is connected to the cross member of a pivoted contact carrying yoke 39. The yoke 39 is pivoted at 40 on a bracket 41 and carries a U-shaped movable contact 42 which engages and electrically connects the two stationary contacts 27 when the arm 37 is in its lower position. The upper portion of the bracket 41 acts as a stop for the yoke 39 when this yoke is in the raised position. In operation, when because of the generation of a predetermined amount of heat by the coil 29, the rod 26 expands to a predetermined extent, the arm 34 of the lever L is moved outward lifting the arm 37 of this lever and thus snapping the movable contact upward and out of contact with the stationary contacts 27. Because of the deenergization of the coil 29, the rod 25 then cools and contracts and the spring 36 moves the arm 34 inward and the arm 37 downward whereby the movable contact 42 is again snapped into engagement wtih the stationary contacts 27.

When the system of Fig. 1 is first started up, the rod 25 is cooled and the switch contacts 27 are closed. Also, since the refrigerator cabinet 8 is comparatively warm, the contacts of the temperature responsive switch T are closed. Current accordingly flows through the wire 44, the contacts 27, the wire 45, the contacts of the switch T, the wires 46 and 47, the heating coils 11 and 29 and the wires 48 and 49. The flow of current in the coil 11 heats the absorbent material 10 and distills the refrigerant therefrom in gaseous form. This refrigerant flows through the pipe 5 and the check valve 22 to the condenser coil 6 where it is cooled and liquefied, the liquid refrigerant collecting in the chamber 19 of the valve V and flowing to the evaporator 7 when this valve opens.

At the same time, the flow of current through the heating coil 29 of the timing switch S heats up the rod 25 and this rod accordingly expands. The rod 25 and the coil 29 are so proportioned and arranged and the set screw 35 is so adjusted that when the heat from the coil 11 has discharged a predetermined amount of refrigerant from the absorbent material 10, the rod 25 will have expanded to the point at which the timing switch contacts 27 are open. At this point, the coils 29 and 11 are deenergized, the distillation cycle is completed and the absorption cycle is initiated. The absorbent material 10 cools off when the coil 11 is deenergized and accordingly, this material starts to absorb gaseous refrigerant which is drawn from the evaporator through the pipes 21 and 5. This absorption of gaseous refrigerant reduces the evaporator pressure and gasification of liquid refrigerant takes place in the evaporator 7, this gasification producing the desired refrigerating or heat absorbing effect.

Because of the insulating sleeve 32, the rod 25 cools off and contracts rather slowly. After a predetermined interval, usually considerably greater than the interval of the distillation cycle, the rod 25 cools and contracts to the point at which the contacts 27 are again closed. If at this point, the temperature of the refrigerator is below the predetermined desired maximum temperature for which the thermostatic switch is set, the contacts of this switch are open and the closing of the contacts 27 of the switch S has no effect. After substantially all of the liquid refrigerant in the evaporator 7 has gasified, the temperature of the refrigerator 8 rises to a point where the contacts of the switch T are closed. This completes the above traced energizing circuit for the heating coils 11 and 29, and another distillation cycle is initiated as described above. The described operation continues automatically so long as electrical energy is supplied to the terminals 24. If at the time that the switch S closes its contacts 27 the refrigerator cabinet has reached the temperature for which the thermostatic switch T is set, the contacts of this switch will be closed and the distillation cycle will be initiated immediately upon the closing of the contacts 27 of the switch S.

It should be noted that although the thermostatic switch T is arranged to prevent the initiation of a distillation cycle until the refrigerator temperature is above a predetermined value, this device is incapable of interrupting a distillation cycle after such cycle has once been initiated. Thus, when a distillation cycle starts, the liquid refrigerant collected in the expansion valve 19 and admitted to the evaporator 7 is at the condenser temperature, that is, at or near room temperature and considerably above the maximum temperature at which the switch T is set to open its contacts. Thus, the temperature within the refrigerator cabinet 8 rises slightly during a distillation cycle and if the switch T is closed at the initiation of such cycle, it remains closed throughout the duration of the cycle. Also, during a distillation cycle, a considerable pressure is built up in the absorber-generator container 9 and in the pipe 5 and condenser coil 6 connected thereto, and the liquid refrigerant in the evaporator cannot gasify and expand against this pressure to any appreciable extent. For this additional reason, the temperature of the refrigerator cabinet 8 is not lowered during a distillation cycle.

In a modified form of the invention shown in Fig. 4, the expansion element or rod 25' of the timing switch S' is mounted within the absorber-generator container 9' or otherwise disposed in heat exchanging relationship to the absorber-generator heating coil 11'. As shown in Fig. 4, the rod 25' may be fixed at one end to the container 9' and its free end may engage a lever 50 pivoted at 51 and connected at its free end through a toggle mechanism 52 to a movable contact 53. The lever 50 is held against the free end of the rod 25' by a spring 54 and a set screw 55 may be provided to variably adjust the action of the switch. The modification of Fig. 4 operates in the same manner as that described above in connection with the modification of Fig. 1, the expansion element of the timing device S' being operated by the heat of the absorber-generator itself rather than by a separate heating coil connected in series with the absorber-generator heating coil.

The rod 25' is preferably surrounded by a sleeve 32' of heat insulating material. The insulating sleeve 32' prevents the rod 25' from heating and expanding at too rapid a rate and thus permits the required amount of refrigerant to be distilled from the absorbent substance before the rod 25' expands to the point at which the heating energy is cut off by the opening of the contacts 53. In further explanation of the purpose of the insulating sleeve 32', it may be noted that the absorbent substance 10 from which the rod 25' derives its heat, rises quickly to the temperature at which the refrigerant is distilled therefrom and thereafter remains at or near substantially such temperature until after substantially all of the refrigerant is driven off, the heat supplied being consumed by reactions accompanying the distillation of the refrigerant. Thus, if the sleeve 32' were not employed, the rod 25' would expand to the point at which it opens the switch S' before the required amount of refrigerant was distilled, or, if set to open the switch at a higher temperature, would not cut off the energy until after substantially all of the available refrigerant had been driven off. Thus, without the sleeve 32', the distillation cycle would be either too short to produce the required amount of refrigerant, or too long with a resultant waste of heating energy.

It will be readily apparent that the control system of the invention presents numerous advantageous features. Because of its simple and rugged construction, the improved temperature operating timing device is inexpensive, reliable and durable. Metal of positive temperature coefficient invariably expands upon heating and the heating or distillation cycle of the system is accordingly positively limited in duration by the very power which motivates this cycle. The timing device can be arranged to occupy an extremely small space and accordingly does not add materially to the size of the apparatus.

Although the thermostatic switch is usually employed in conjunction with the timing device to automatically control the degree of refrigeration in accordance with the temperature of the refrigerated space, it is not essential to the invention in its broader aspects that this device be invariably included. Thus, in certain cases, where heat is to be absorbed from a refrigerated space or other medium at a substantially constant rate, the timing device alone is sufficient to automatically control the operation of the system.

In the disclosed embodiment of the invention, electricity is employed as a source of energy to heat the absorber-generator to distill the gaseous refrigerant therefrom, but it should be understood that the invention is not limited to the use of this form of energy for this purpose. Thus, the absorber-generator might be heated by the burning of gas, and the flow of such gas controlled by a periodically operable device similar to the device disclosed and operated by the heat derived from the gas. Such gas control device could, of course, be employed either alone or in combination with a gas valve operated in accordance with the temperature of the refrigerated space or evaporator.

We claim:

1. In a refrigeration system of the absorption type, in combination with an absorbent and a refrigerant and means for heating the absorbent to distill the refrigerant therefrom, a device for controlling the supply of energy to said heating means comprising means for supplying such energy and means operable by the flow of such energy to the heating means for cutting off the supply of such energy after a predetermined interval.

2. In a refrigeration system of the absorption type, in combination with an absorbent and a refrigerant and means for heating the absorbent to distill the refrigerant therefrom, a device for controlling the supply of energy to said heating means comprising means operated by the flow of such energy to said heating means for cutting off the supply of such energy after a predetermined interval and means operable a predetermined interval after such energy is cut off for again supplying such energy.

3. In a refrigeration system of the absorption type, in combination with an absorbent and a refrigerant and a heating unit for heating said absorbent to distill refrigerant therefrom, a device for controlling the supply of heating energy to said heating unit comprising an expansible element, means operated by said element for supplying energy to said unit when said element has contracted to a predetermined extent and for cutting off such supply of energy when said element has expanded to a predetermined extent and means energized by the energy for heating said unit for heating said element to cause the expansion thereof when such heating unit is energized.

4. In a refrigeration system of the absorption type, in combination with an absorbent and a refrigerant and a heating unit for heating said absorbent to distill refrigerant therefrom, a device for controlling the supply of heating energy to said heating unit comprising an expansible element disposed in heat exchanging relation to said heating unit, and means operated by said expansible element for supplying energy to said unit when said element has cooled and contracted to a predetermined extent and for cutting off such energy supply when said element has been heated and so expanded to a predetermined extent.

5. In a refrigeration system of the type comprising a refrigerant, an absorbent therefor, means for condensing the refrigerant expelled from the absorbent and an evaporator in which the condensed refrigerant is at times permitted to gasify, in combination with a heating unit for heating the absorbent to distill the refrigerant therefrom, means for controlling the supply of heating energy to the heating unit comprising a device operated by the flow of such energy to said heating unit for alternately supplying such energy for a predetermined interval and cutting off the supply of such energy for a predetermined interval and means responsive to the temperature of said evaporator for at times preventing the supply of such heating energy by said device.

6. In a refrigeration system of the type comprising a refrigerant, an absorbent therefor, means for condensing the refrigerant expelled from the absorbent and an evaporator in which the condensed refrigerant is at times permitted to gasify, in combination with a heating unit for heating the absorbent to distill the refrigerant therefrom, means for controlling the supply of heating energy to the heating unit comprising a device operated by the flow of such energy to said heating unit for alternately supplying such energy for a predetermined interval and cutting off the supply of such energy for a predetermined interval and means responsive to the temperature of said evaporator for preventing the supply of such heating energy by said device only if the evaporator temperature is below a predetermined value at the time that such device operates to initiate the supply of such heating energy.

7. In a refrigeration system of the type comprising a refrigerant, an absorbent therefor, means for condensing the refrigerant expelled from the absorbent and an evaporator in which the condensed refrigerant is at times permitted to gasify, in combination with a heating unit for heating the absorbent to distill the refrigerant therefrom, means for controlling the supply of heating energy to the heating unit comprising a device including an expansible element disposed in heat exchanging relation to said heating unit, means operated by said element for supplying heating energy to said unit when said element has cooled and contracted to a predetermined extent and for cutting off the supply of such energy when said element has been heated and expanded to a predetermined extent and means responsive to the temperature of said evaporator for at times preventing the supply of heating energy to said unit by the means operated by the expansible element.

8. In a refrigeration system of the type comprising a refrigerant, an absorbent therefor, means for condensing the refrigerant expelled from the absorbent and an evaporator in which the condensed refrigerant is at times permitted to gassify, in combination with a heating unit for heating the absorbent to distill the refrigerant therefrom, means for controlling the supply of heating energy to the heating unit comprising a device including an expansible element disposed in heat exchanging relation to said heating unit, means operated by said element for supplying heating energy to said unit when said element has cooled and contracted to a predetermned extent and for cutting off the supply of energy when said element has been heated and expanded to a predetermined extent and means responsive to the temperature of said evaporator for preventing the supply of heating energy to said unit by the means operated by said expansible element only if the evaporator temperature is below a predetermined value at the time that said expansible element has cooled and contracted to said predetermined extent.

9. In a refrigerating system of the type comprising a refrigerant, an absorbent therefor, means for condensing the refrigerant expelled from the absorbent and an evaporator in which the condensed refrigerant is at times permitted to gasify, in combination with a heating unit for heating the absorbent to distill the refrigerant therefrom, means for controlling the supply of heating energy to the heating unit comprising a device including a thermally expansible element and means operated by such element for supplying heating energy to said unit when said element has cooled and contracted to a predetermined extent and for cutting off the supply of such energy when said element has been heated and expanded to a predetermined extent, means energized by the energy for said heating unit for heating said expansible element to cause the expansion thereof when the heating unit is energized and means responsive to the temperature of said evaporator for at times preventing the supply of heating energy to said unit by said device.

10. In a refrigerating system of the type comprising a refrigerant, an absorbent therefor, means for condensing the refrigerant expelled from the absorbent and an evaporator in which the condensed refrigerant is at times permitted to gasify, in combination with a heating unit for heating the absorbent to distill the refrigerant therefrom, means for controlling the supply of heating energy to the heating unit comprising a device including a thermally expansible element and means operated by such element for supplying heating energy to said unit when said element has cooled and contracted to a predetermined extent and for cutting off the supply of such energy when said element has been heated and expanded to a predetermined extent, means energized by the energy for said heating unit for heating said expansible element to cause the expansion thereof when the heating unit is energized and means responsive to the temperature of said evaporator for preventing the supply of heating energy to said unit by said device only if the evaporator is below a predetermined value at the time that said expansible element has cooled and contracted to said predetermined extent.

In testimony whereof we affix our signatures.

JOHN G. RUCKELSHAUS.
NORMAN W. KEMPF.